US006925640B2

(12) United States Patent
Allison (10) Patent No.: US 6,925,640 B2
(45) Date of Patent: Aug. 2, 2005

(54) METHOD AND APPARATUS FOR EXTENDING A PROGRAM ELEMENT IN A DYNAMICALLY TYPED PROGRAMMING LANGUAGE

(75) Inventor: David S. Allison, San Ramon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 641 days.

(21) Appl. No.: 09/977,508

(22) Filed: Oct. 12, 2001

(65) Prior Publication Data

US 2002/0178435 A1 Nov. 28, 2002

(51) Int. Cl.[7] ................................. G06F 9/44
(52) U.S. Cl. ............................... 717/165
(58) Field of Search ................................. 717/165

(56) References Cited

U.S. PATENT DOCUMENTS

| | | | | |
|---|---|---|---|---|
| 5,421,016 A | * | 5/1995 | Conner et al. | 717/146 |
| 5,634,114 A | * | 5/1997 | Shipley | 717/170 |
| 5,682,536 A | * | 10/1997 | Atkinson et al. | 717/165 |
| 5,898,875 A | * | 4/1999 | Nakamura et al. | 717/165 |
| 6,003,095 A | * | 12/1999 | Pekowski et al. | 717/163 |
| 6,035,121 A | * | 3/2000 | Chiu et al. | 717/141 |
| 6,182,279 B1 | * | 1/2001 | Buxton | 717/100 |
| 6,212,673 B1 | * | 4/2001 | House et al. | 717/100 |
| 6,263,492 B1 | * | 7/2001 | Fraley et al. | 717/107 |
| 6,327,705 B1 | * | 12/2001 | Larsson et al. | 717/174 |
| 6,334,213 B1 | * | 12/2001 | Li | 717/170 |
| 6,347,398 B1 | * | 2/2002 | Parthasarathy et al. | 717/178 |
| 6,378,127 B1 | * | 4/2002 | Delo | 717/174 |
| 6,381,735 B1 | * | 4/2002 | Hunt | 717/158 |
| 6,418,554 B1 | * | 7/2002 | Delo et al. | 717/174 |
| 6,418,555 B2 | * | 7/2002 | Mohammed | 717/169 |
| 6,427,230 B1 | * | 7/2002 | Goiffon et al. | 717/108 |
| 6,430,740 B1 | * | 8/2002 | Hart et al. | 717/108 |
| 6,442,752 B1 | * | 8/2002 | Jennings et al. | 717/162 |
| 6,446,256 B1 | * | 9/2002 | Hyman et al. | 717/143 |
| 6,463,583 B1 | * | 10/2002 | Hammond | 717/162 |
| 6,484,309 B2 | * | 11/2002 | Nowlin et al. | 717/100 |
| 6,490,723 B1 | * | 12/2002 | Bearden et al. | 717/174 |
| 6,598,052 B1 | * | 7/2003 | Saulpaugh et al. | 707/102 |
| 6,606,632 B1 | * | 8/2003 | Saulpaugh et al. | 707/102 |
| 6,631,516 B1 | * | 10/2003 | Baumgart et al. | 717/143 |
| 6,757,000 B2 | * | 6/2004 | Nagashima et al. | 715/835 |
| 6,769,001 B2 | * | 7/2004 | Halstead et al. | 707/103 R |

OTHER PUBLICATIONS

Beginning Visual C++ 5, Ivor Horton, WROX, Mar. 19, 1997, pp. 7—48, 267–360,715–734.*
IBM Dictionary of Computing, IBM, 1994, p. 225.*
Microsoft Press Computer Dictionary, Third Edition, Sep. 19, 1997, p. 166.*
Object–Oriented, Single–Source, On–line Documents, That Update Themselves, Susan Korgen, ACM, 1996, pp. 229–237.*
Portable Run–Time Support for Dynamic Object–Oriented Parallel Processing, Andrew Grimshaw et al, ACM, May 1996, pp. 139–170.*

* cited by examiner

*Primary Examiner*—Todd Ingberg
(74) *Attorney, Agent, or Firm*—Osha–Liang LLP (57) ABSTRACT

Embodiments of the present invention are directed to a method and apparatus for extending a program element in a dynamically typed programming language. In one embodiment, a program element is extended without altering the source code defining the program element. An extend structure is used to extend a program element in a particular program. In one embodiment, the program element is a function. The function is extended by adding code to be executed by the function. In another embodiment, the program element is an enumeration. The enumeration is extend by adding additional constants to the enumeration. In another embodiment, the program element is a class. In one embodiment, a class is extended by adding code to the constructor of the class. In another embodiment, a class is extended by adding member variables to the class. In yet another embodiment, a class is extended by adding member functions to the class.

30 Claims, 7 Drawing Sheets

METHOD AND APPARATUS FOR EXTENDING A PROGRAM ELEMENT IN A DYNAMICALLY TYPED PROGRAMMING LANGUAGE

BACKGROUND OF THE INVENTION

1. Field of the Invention

The present invention relates to the field of computer programming languages, and in particular to a method and apparatus for extending a program element in a dynamically typed programming language.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

A typical computer program is comprised of many program elements. Program elements include functions, classes and enumerations. Program elements are defined by computer code. In prior art systems, once an element is defined, the only way to extend the program element (i.e., add code to the program element) is to modify the source code for the program element. This may not be either desirable or possible if the element is part of a library or a shared repository. This problem can be better understood with a review of program elements.

Program Elements

Program elements are defined using computer code written in a computer programming language. Enumerations are structural elements and are used to define a list of items. For example, in the code below, an enumeration defines a new type, primes_less_than_ten.

```
enum primes_less_than_ten {
    TWO, THREE, FIVE, SEVEN
}
```

Functions are elements that perform calculations or operations in a program. Functions typically have one or more program code statements that are executed when the function is called. For example, in the code below, a function defines a set of calculations which determine N factorial, which is defined as N*(N–1)* . . . *1.

```
int factorial (int N) {
    if(N == 0) {
        return 1;
    } else {
        return N * factorial (N – 1);
    }
}
```

A class is a structure that contains variables and functions as members. Typically, a class is defined by listing the member variables and functions according to the structure imposed by the programming language in use. For example, in the code below, a class defines a box data structure which has variables length, width and height as well as member functions volume and surface_area.

```
class box {
    int length, width, height;
    int volume( ) {
        return length * width * height;
    }
    int surface_area( ) {
        return 2 * (length * width + length * height + width * height);
    }
}
```

Extending Program Elements

In some cases, it may be desirable to extend (i.e., add to) a program element. For example, in the enumeration above, a programmer may wish to include the member ONE in primes_less_than_ten. Similarly, a programmer may wish to track the number of recursive calls to factorial by incrementing a counter and printing the counter to the screen each time a recursive call is made. A programmer may wish to extend the above "box" class by adding a variable to represent how many items are placed in the box.

In prior art programming languages, a programmer must modify the source code to extend a program element. In the above examples, the source code becomes:

```
enum primes_less_than_ten {
    ONE, TWO, THREE, FIVE, SEVEN
}
int factorial (int N) {
    if (N== 0) {
        counter = counter + 1;  // counter has been declared before this
                                // section of code is executed, and is
                                // initialized to 0
        cout << counter << " ";
        return 1;
    }
    else {
        counter = counter + 1;  // counter has been declared before this
                                // section of code is executed, and is
                                // initialized to 0
        cout << counter << " "
        return N * factorial (N – 1);
    }
}
class box {
    int length, width, height, number_in_box;
    int volume( ) {
        return length * width * height;
    }
    int surface_area( ) {
        return 2 * (length * width + length * height + width * height);
    }
}
```

However, sometimes, it is not desirable or even possible for a programmer to modify the source code used to create a program element. For example, a program element may be defined in a library which the programmer is unable to modify. In another example, the program element is defined in a shared repository of program code. Altering the program element's source code could result in adverse consequences to other programs that use the shared repository to define the program element.

SUMMARY OF THE INVENTION

Embodiments of the present invention are directed to a method and apparatus for extending a program element in a dynamically typed programming language. In one embodiment, a program element is extended without altering the source code defining the program element. An extend structure is used to extend a program element in a particular program. Thus, the program element may be defined in a shared repository and extended in a particular program.

In one embodiment, the program element is a function. The function is extended by adding code to be executed by the function. In one embodiment, the added code executes after all the original code executed. In another embodiment, the program element is an enumeration. The enumeration is extend by adding additional identifiers to the enumeration.

In yet another embodiment, the program element is a class. In one embodiment, a class is extended by adding code to the constructor of the class (i.e., the function that creates an instance of the class). In another embodiment, a class is extended by adding member variables to the class. In yet another embodiment, a class is extended by adding member functions to the class.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for extending a program element in a dynamically typed programming language. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Extending a Program Element

In one embodiment, a program element is extended without altering the source code defining the program element. An extend structure is used to extend a program element in a particular program. Thus, the program element may be defined in a shared repository and extended in a particular program.

Figure 1:
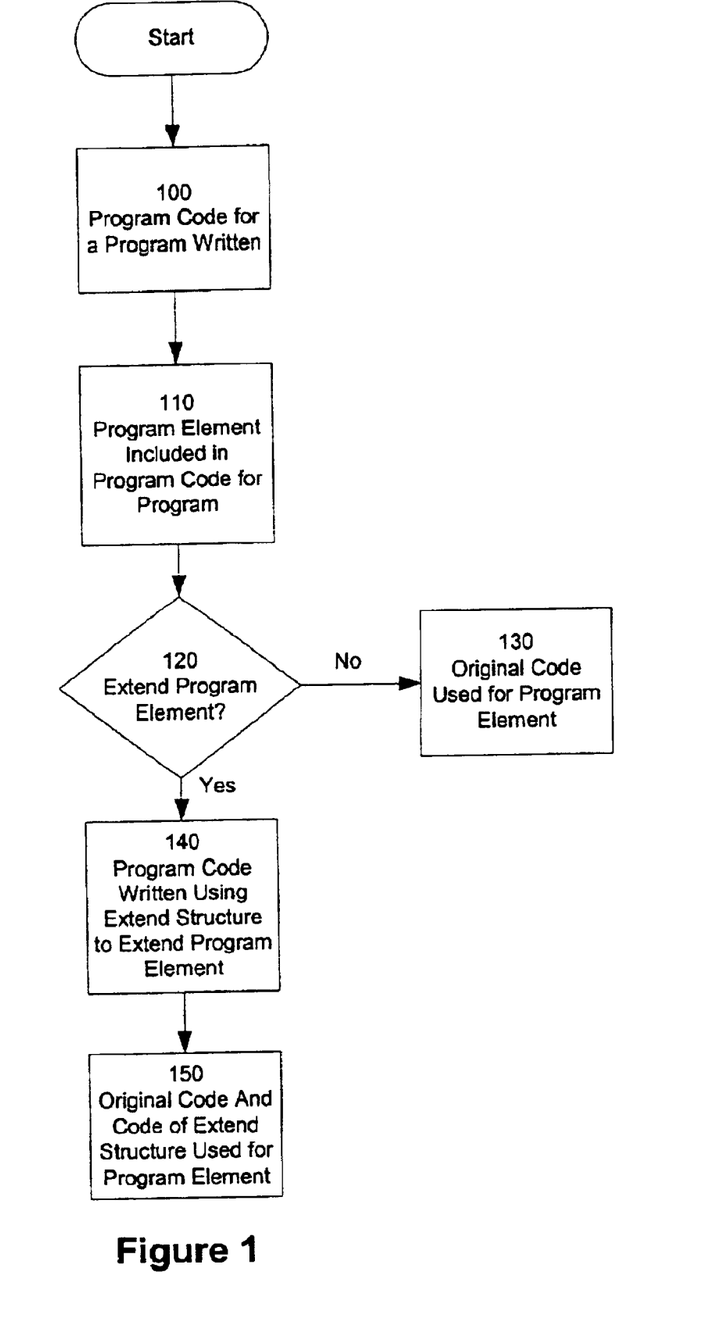
FIG. 1 is a flow diagram of the process of extending a program element in accordance with one embodiment of the present invention.

FIG. 1 illustrates the process of extending a program element in accordance with one embodiment of the present invention. At block 100, program code for a program is written. At block 110, a program element is included in the program code for a program. The program element may be defined in a shared or non-shared repository or may be defined in the program code of the program.

At block 120, it is determined whether the program element is to be extended. If the program element is not to be extended, at block 130, the original code is used for the program element. If the program element is to be extended, at block 140, program code is written using an extend structure to extend the program element. At block 150, the original code and the code of the extend structure are used for the program element.

In one embodiment, the extend structure is of the following form:

```
extend ElementName (args) {
    body
}
```

ElementName is the name of the program element being extended. In one embodiment, the args value is optional. In another embodiment, if the args value is present, a default value must be provided. The default values allow existing references to the program element to be executed without being rewritten.

Figure 2:
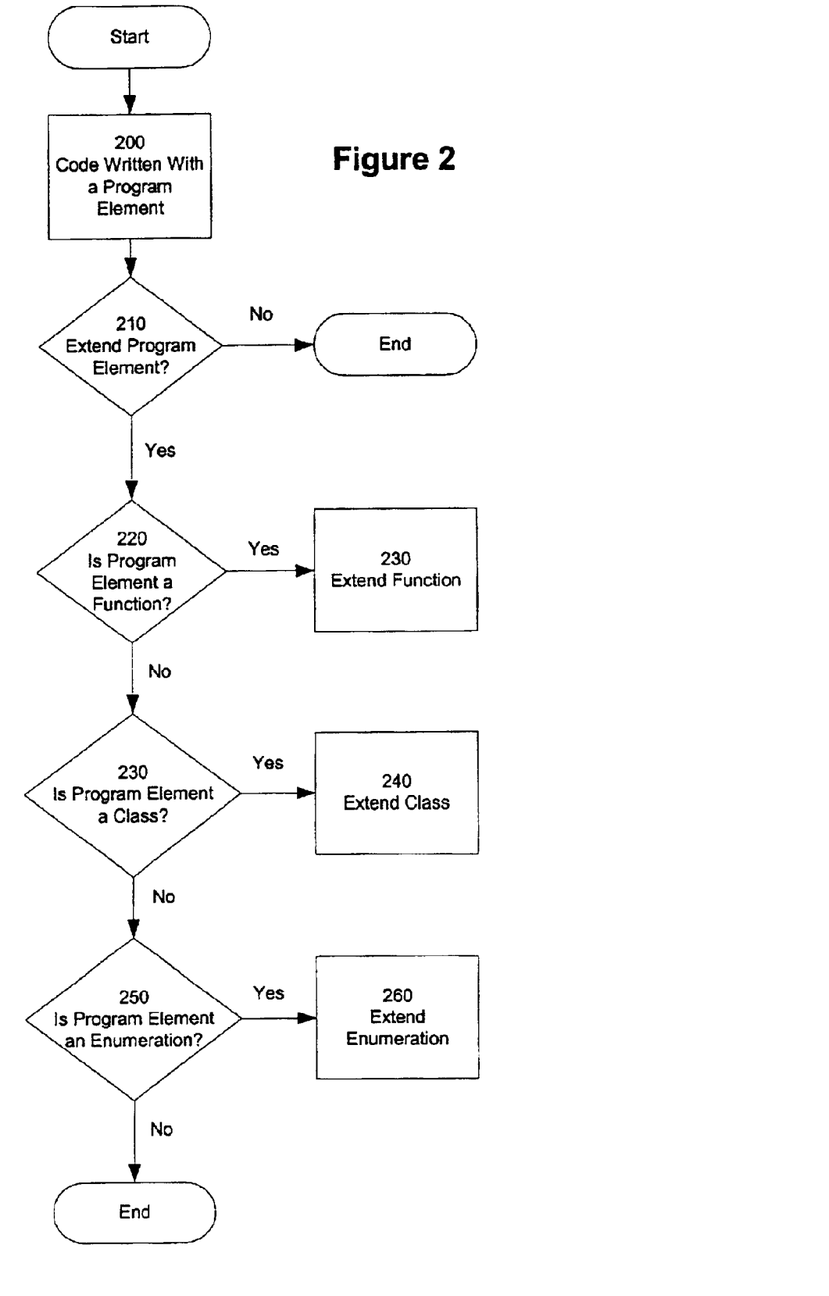
FIG. 2 is a flow diagram of the process of extending a program element in accordance with one embodiment of the present invention.

Functions, enumerations and classes are all types of program elements that can be extended. FIG. 2 illustrates the process of extending a program element in accordance with one embodiment of the present invention. At block 200, code is written with a program element. At block 210, it is determined whether the program element is to be extended. If the program element is not to be extended, the process ends. If the program element is to be extended, at block 220, it is determined whether the program element is a function.

If the program element is a function, at block 230, the function is extended. If the element is not a function, at block 240, it is determined wither the program element is a class. If the program element is a class, at block 250, the class is extended. If the program element is not a class, at block 260 it is determined whether the program element is an enumeration. If the program element is an enumeration, at block 270, the enumeration is extended. If the program element is not an enumeration, the process ends.

Extending a Function

In one embodiment, the program element is a function. The function is extended by adding code to be executed by the function. In one embodiment, the added code executes after all the original code executed.

Figure 3:
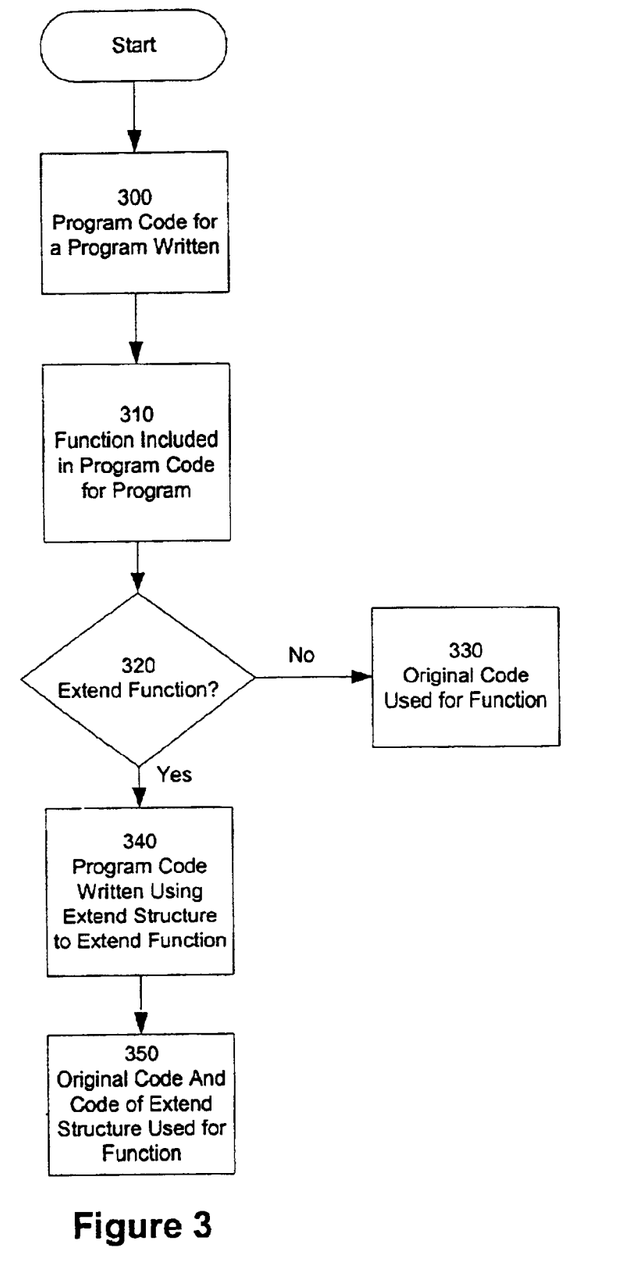
FIG. 3 is a flow diagram of the process of extending a function in accordance with one embodiment of the present invention.

FIG. 3 illustrates the process of extending a function in accordance with one embodiment of the present invention. At block 300, program code for a program is written. At block 310, a function is included in the program code for a program. The function may be defined in a shared or non-shared repository or may be defined in the program code of the program.

At block 320, it is determined whether the function is to be extended. If the function is not to be extended, at block 330, the original code is used for the function. If the function is to be extended, at block 340, program code is written using an extend structure to extend the function. At block 350, the original code and the code of the extend structure are used for the function.

An example of extending a function follows below:

```
var add-some-numbers (var &result, var x, var y, var z) {
    result = x + y + z;
}
extend add-some-numbers (var q=0) {
    result = x + y + z + q;
}
```

In the above example, a function named add-some-numbers is originally defined as having four arguments. The second, third and fourth arguments are added together, and the sum is stored in the first argument. By using the extend structure, the add-some-numbers function is changed to a function that takes either four or five arguments. If the function is called with five arguments, the fifth argument is assigned to the variable q in the extended function. If only four arguments are provided, the extended argument variable q is set to its default value of 0.

The original body of the function is executed. Thus, the second, third and fourth arguments are added together, and the sum is stored in the first argument. Then, the extended code for the function is executed. Thus, the value of q (i.e., either the default of 0 or the fifth argument), and the second, third and fourth arguments are added together, and the sum is stored in the first argument.

Figure 4:
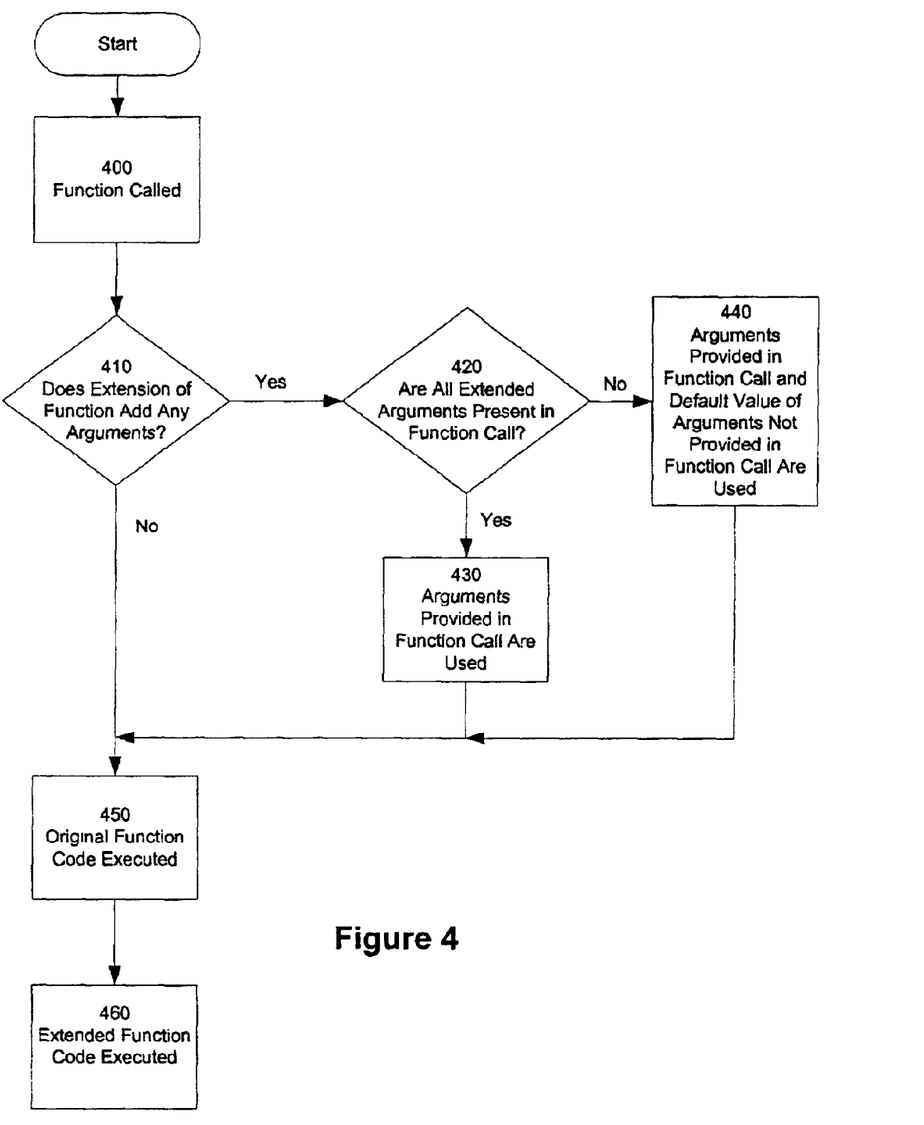
FIG. 4 is a flow diagram of the process of executing an extended function in accordance with one embodiment of the present invention.

FIG. 4 illustrates the process of executing an extended function in accordance with one embodiment of the present invention. At block 400, the function is called. At block 410, it is determined whether the extension of the function added any arguments. If the extension of the function added arguments, at block 420, it is determined whether all extended arguments are present in the function call. If all extended arguments are present in the function call, at block 430, the arguments provided in the function call are used and the process continues at block 450.

If not all extended arguments are present in the function call, at block 440, the arguments provided in the function call and the default value of arguments not provided in the function call are used and the process continues at block 450. If the extension of the function did not add any arguments, at block 450, the original function code is executed. At block 460, the extended function code is executed.

Extending an Enumeration

Figure 5:
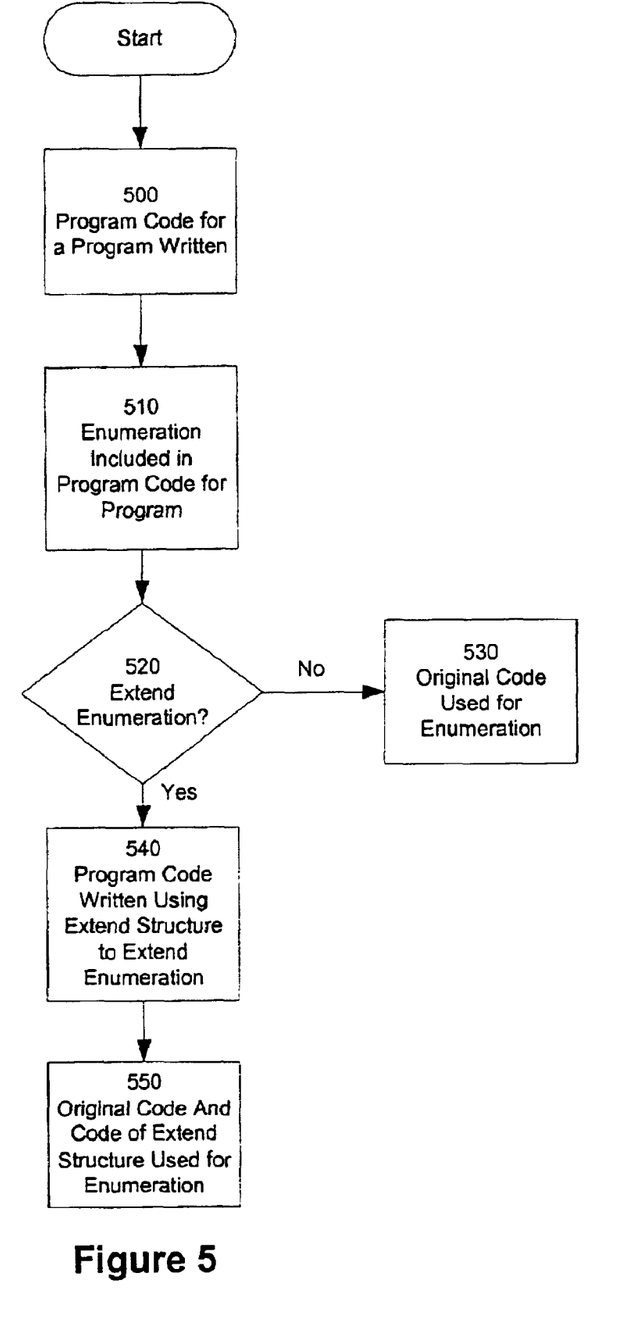
FIG. 5 is a flow diagram of the process of extending an enumeration in accordance with one embodiment of the present invention.

In another embodiment, the program element is an enumeration. The enumeration is extend by adding additional identifiers to the enumeration. FIG. 5 illustrates the process of extending an enumeration in accordance with one embodiment of the present invention. At block 500, program code for a program is written. At block 510, an enumeration is included in the program code for a program. The enumeration may be defined in a shared or non-shared repository or may be defined in the program code of the program.

At block 520, it is determined whether the enumeration is to be extended. If the enumeration is not to be extended, at block 530, the original code is used for the enumeration. If the enumeration is to be extended, at block 540, program code is written using an extend structure to extend the enumeration. At block 550, the original code and the code of the extend structure are used for the enumeration.

An example of extending an enumeration follows below:

```
enum some_prime_numbers {
    TWO, THREE, FIVE, SEVEN
}
extend some_prime_numbers {
    ELEVEN, THIRTEEN, SEVENTEEN, NINETEEN
}
```

In the above example, an enumeration named some_prime_numbers is originally defined as having four members. By using the extend structure, the some_prime_numbers enumeration is extended to contain four new members in addition to the four original members.

Extending a Class

In another embodiment, the program element is a class. In one embodiment, a class is extended by adding code to the constructor of the class (i.e., the function that creates an instance of the class). In another embodiment, a class is extended by adding member variables to the class. In yet another embodiment, a class is extended by adding member functions to the class.

Figure 6:
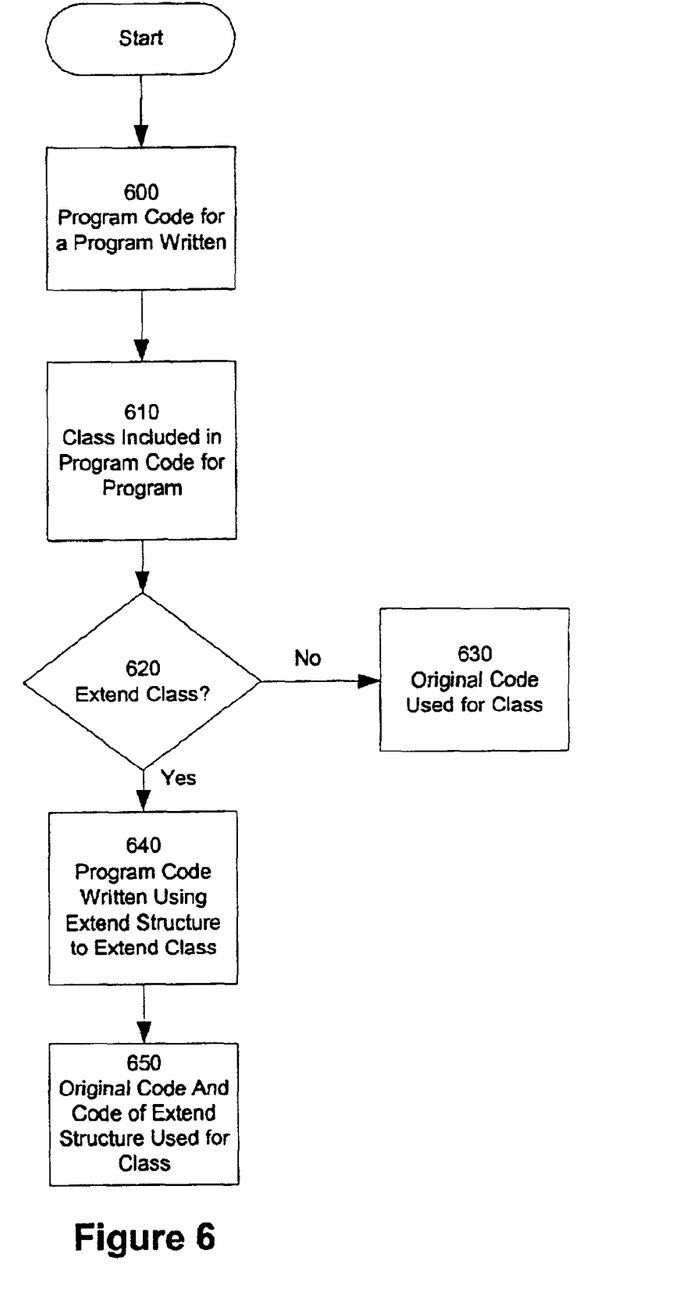
FIG. 6 is a flow diagram of the process of extending a class in accordance with one embodiment of the present invention.

FIG. 6 illustrates the process of extending a class in accordance with one embodiment of the present invention. At block 600, program code for a program is written. At block 610, a class is included in the program code for a program. The class may be defined in a shared or non-shared repository or may be defined in the program code of the program.

At block 620, it is determined whether the class is to be extended. If the class is not to be extended, at block 630, the original code is used for the class. If the class is to be extended, at block 640, program code is written using an extend structure to extend the class. At block 650, the original code and the code of the extend structure are used for the class.

An example of extending a class follows below:

```
class box {
    var length, width, height;
    var volume( ) {
        return length * width * height;
    }
}
extend box {
    var number-in-box;
    var surface_area( ) {
        return 2 * (length * width + length * height + width * height);
    }
}
```

In the above example, a class named box is originally defined as having the member variables length, width and height as well as the member function volume. By using the extend structure, the box class is extended to contain the member variable number-in-box in addition to the original member variables. Also, the box class is extended to contain the member function surface_area in addition to original member function.

Embodiment of Computer Execution Environment (Hardware)

Figure 7:
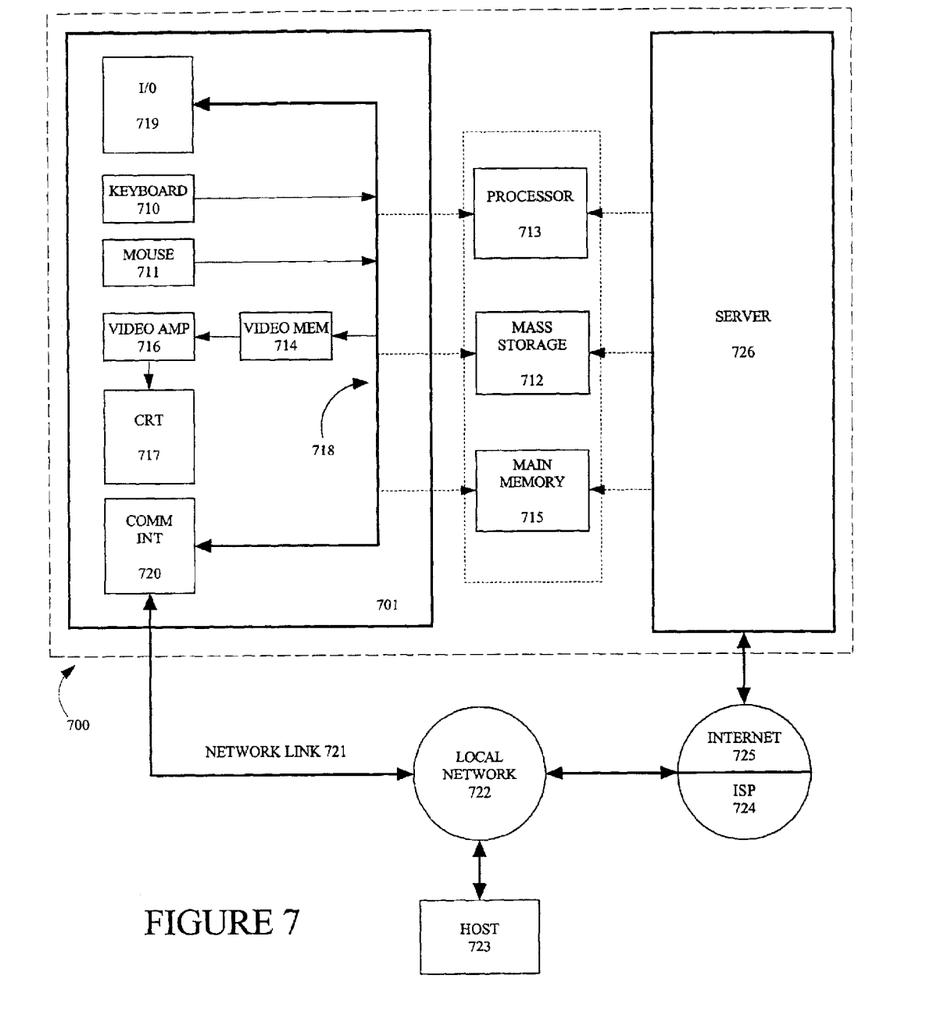
FIG. 7 is a block diagram of a general purpose computer.

An embodiment of the invention can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a SPARC microprocessor from Sun Microsystems, Inc., a microprocessor manufactured by Motorola, such as the 680x0 processor, or a microprocessor manufactured by Intel, such as the 80x86 or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for extending a program element in a dynamically typed programming language is described in conjunction with one or more specific embodiments. The invention is defined by the following claims and their full scope and equivalents.

What is claimed is:

1. A method of extending a program element comprising:
   writing source code wherein said source code includes said program element;
   determining if said program element is to be extended; and extending said program element, if so, using an extend structure, wherein the extend structure is included in the source code.

2. The method of claim 1 wherein said program element is defined in a repository of computer code.

3. The method of claim 1 wherein said program element is a function.

4. The method of claim 3 wherein said extending comprises:

providing a set of program code wherein said program code is executed whenever said function is executed.

5. The method of claim 1 wherein said program element is an enumeration.

6. The method of claim 5 wherein said extending comprises:

providing a set of program code wherein said program code adds one or more elements to said enumeration.

7. The method of claim 1 wherein said program element is a class.

8. The method of claim 7 wherein said extending comprises:

providing a set of program code wherein said program code adds one or more member variables to said class.

9. The method of claim 7 wherein said extending comprises:

providing a set of program code wherein said program code adds one or more member functions to said class.

10. The method of claim 7 wherein said extending comprises:

providing a set of program code wherein said set is executed whenever a constructor for said class is executed.

11. A program element extender comprising:

source code wherein said source code includes a program element; and a determiner configured to determine if said program element is to be extended; and an extender configured to extend said program element, if so, using an extend structure, wherein the extend structure is included in the source code.

12. The program element extender of claim 11 wherein said program element is defined in a repository of computer code.

13. The program element extender of claim 11 wherein said program element is a function.

14. The program element extender of claim 13 wherein said extender comprises:

a program code provider configured to provide a set of program code wherein said program code is executed whenever said function is executed.

15. The program element extender of claim 11 wherein said program element is an enumeration.

16. The program element extender of claim 15 wherein said extender comprises:

a program code provider configured to provide a set of program code wherein said program code adds one or more elements to said enumeration.

17. The program element extender of claim 11 wherein said program element is a class.

18. The program element extender of claim 17 wherein said extender comprises:

a program code provider configured to provide a set of program code wherein said program code adds one or more member variables to said class.

19. The program element extender of claim 17 wherein said extender comprises:

a program code provider configured to provide a set of program code wherein said program code adds one or more member functions to said class.

20. The program element extender of claim 17 wherein said extender comprises:

a program code provider configured to provide a set of program code wherein said set is executed whenever a constructor for said class is executed.

21. A computer program product comprising:

a computer usable medium having computer readable program code embodied therein configured for extending a program element, comprising:

computer readable code configured to cause a computer to provide source code wherein said source code includes a program element;

computer readable code configured to cause a computer to determine if said program element is to be extended; and computer readable code configured to cause a computer to extend said program element, if so, using an extend structure, wherein the extend structure is included in the source code.

22. The computer program product of claim 21 wherein said program element is defined in a repository of computer code.

23. The computer program product of claim 21 wherein said program element is a function.

24. The computer program product of claim 23 wherein said computer readable code configured to cause a computer to extend comprises:

computer readable cede configured to cause a computer to provide a set of program code wherein said program code is executed whenever said function is executed.

25. The computer program product of claim 21 wherein said program element is an enumeration.

26. The computer program product of claim 25 wherein said computer readable code configured to cause a computer to extend comprises:

computer readable code configured to cause a computer to provide a set of program code wherein said program code adds one or more elements to said enumeration.

27. The computer program product of claim 21 wherein said program element is a class.

28. The computer program product of claim 27 wherein said computer readable code configured to cause a computer to extend comprises:

computer readable code configured to cause a computer to provide a set of program code wherein said program code adds one or more member variables to said class.

29. The computer program product of claim 27 wherein said computer readable code configured to cause a computer to extend comprises:

computer readable code configured to cause a computer to provide a set of program code wherein said program adds one or more member functions to said class.

30. The computer program product of claim 27 wherein said computer readable code configured to cause a computer to extend comprises:

computer readable code configured to cause a computer to provide a set of program code wherein said set is executed whenever a constructor for said class is executed.

* * * * *

UNITED STATES PATENT AND TRADEMARK OFFICE
CERTIFICATE OF CORRECTION

PATENT NO. : 6,925,640 B2
DATED : August 2, 2005
INVENTOR(S) : David S. Allison

It is certified that error appears in the above-identified patent and that said Letters Patent is hereby corrected as shown below:

Column 10,
Line 34, replace the word "cede" with -- code --.

Signed and Sealed this

Twenty-seventh Day of September, 2005

JON W. DUDAS
*Director of the United States Patent and Trademark Office*